United States Patent [19]
Kikuchi et al.

[11] Patent Number: 5,570,782
[45] Date of Patent: Nov. 5, 1996

[54] DISK CARTRIDGE CASE

[75] Inventors: Shuichi Kikuchi; Yuji Iwaki, both of Miyagi; Toshiro Kobayashi, Kanagawa, all of Japan

[73] Assignee: Sony Corporation, Tokyo, Japan

[21] Appl. No.: 330,502

[22] Filed: Oct. 28, 1994

[30] Foreign Application Priority Data

| Nov. 2, 1993 | [JP] | Japan | 5-274608 |
| Dec. 28, 1993 | [JP] | Japan | 5-335772 |

[51] Int. Cl.⁶ ................................................. B65D 85/57
[52] U.S. Cl. ...................... 206/308.3; 206/312; 229/149; 229/23 AB
[58] Field of Search ................................. 206/308.3, 311, 206/312, 313, 806; 229/149, 23 R, 23 AB

[56] References Cited

U.S. PATENT DOCUMENTS

| 4,020,947 | 5/1977 | Roccaforte | 206/806 |
| 4,040,105 | 8/1977 | Sindee | 206/308.3 |
| 4,640,413 | 2/1987 | Kaplan et al. | 206/308.3 |
| 4,667,819 | 5/1987 | Lu | 206/311 |
| 5,364,021 | 11/1994 | Munk | 206/806 |

FOREIGN PATENT DOCUMENTS

| 5-16907 | 1/1993 | Japan . |
| 5-147682 | 6/1993 | Japan . |
| 5-178386 | 7/1993 | Japan . |
| 5-221477 | 8/1993 | Japan . |
| 5-221478 | 8/1993 | Japan . |
| 5-270581 | 10/1993 | Japan . |
| 5-330587 | 12/1993 | Japan . |
| 6-156565 | 6/1994 | Japan . |
| 6-156569 | 6/1994 | Japan . |
| 2272887 | 1/1994 | United Kingdom . |

*Primary Examiner*—David T. Fidei
*Attorney, Agent, or Firm*—Pasquale Musacchio; Jerry A. Miller

[57] ABSTRACT

A disk cartridge case is disclosed which has improved durability and which enables hanging for display or storage purposes. The disk cartridge case includes a case body and a cover for covering a cartridge inserting port provided on the case body. The cover has a cover back member superposed on a case body back member of the case body, a cover front member, a front forming plate, a closing member and a bottom member. The cover back member has a non-adhesion portion located on a side of the closing member and being capable of contacting and separating from the case body back member and an adhesion portion located at an opposite-side of the closing member and being adhered to the case body back member. Furthermore, the cover front member includes an insertion tab having a locking tab. The insertion tab and locking tab are received by a slot formed in the front forming plate. Then, by hooking the locking tab on edge of the slot, the cover front member is secured to the front forming plate.

26 Claims, 9 Drawing Sheets

DISK CARTRIDGE CASE

FIELD OF THE INVENTION

This invention relates to a disk cartridge case, and more particularly to a disk cartridge case of a pocket shape for accommodating disk cartridges such as 3.5 inch micro floppy disks.

BACKGROUND

For a disk cartridge case accommodating a 3.5 inch micro floppy disk, heretofore known is a conventional disk cartridge case in which paper board is folded and bent into a pocket shape. Typically, the conventional disk cartridge case is produced by bending a sheet of paper board. However, the resulting structure and configuration of such cases has disadvantages. A disadvantage is that such cases have poor durability since portions of the paper board tend to be easily damaged due to the configuration of the case. Further, it is frequently desirable to hang a case on a hanger rod or the like for display or storage purposes. However, such cases do not include a tab to enable hanging of the case.

SUMMARY OF THE INVENTION

An object of the present invention is to provide a disk cartridge case having a high durability with easier handling.

According to the present invention, A disk cartridge case has a case body for accommodating a disk cartridge and a cover for opening and closing a cartridge inserting port provided on one-end of the case body. The case body has a case body back member, a case body front plate and a side plate. The cover has a cover back member superposed on the case body back member of the case body, a cover front member superposed on the case body front plate of the case body, a front forming member, a closing portion for opening and closing the cartridge inserting port located between the cover back member and the cover front member and a bottom member located between the cover back member and the front forming plate. The back member includes a non-adhesion portion located at a side of the closing member and being capable of contacting and separating from the case body back member of the case body and an adhesion portion located at an opposite side of the closing member and being adhered to the case body back member of the case body.

DESCRIPTION OF THE INVENTION

Figure 1:
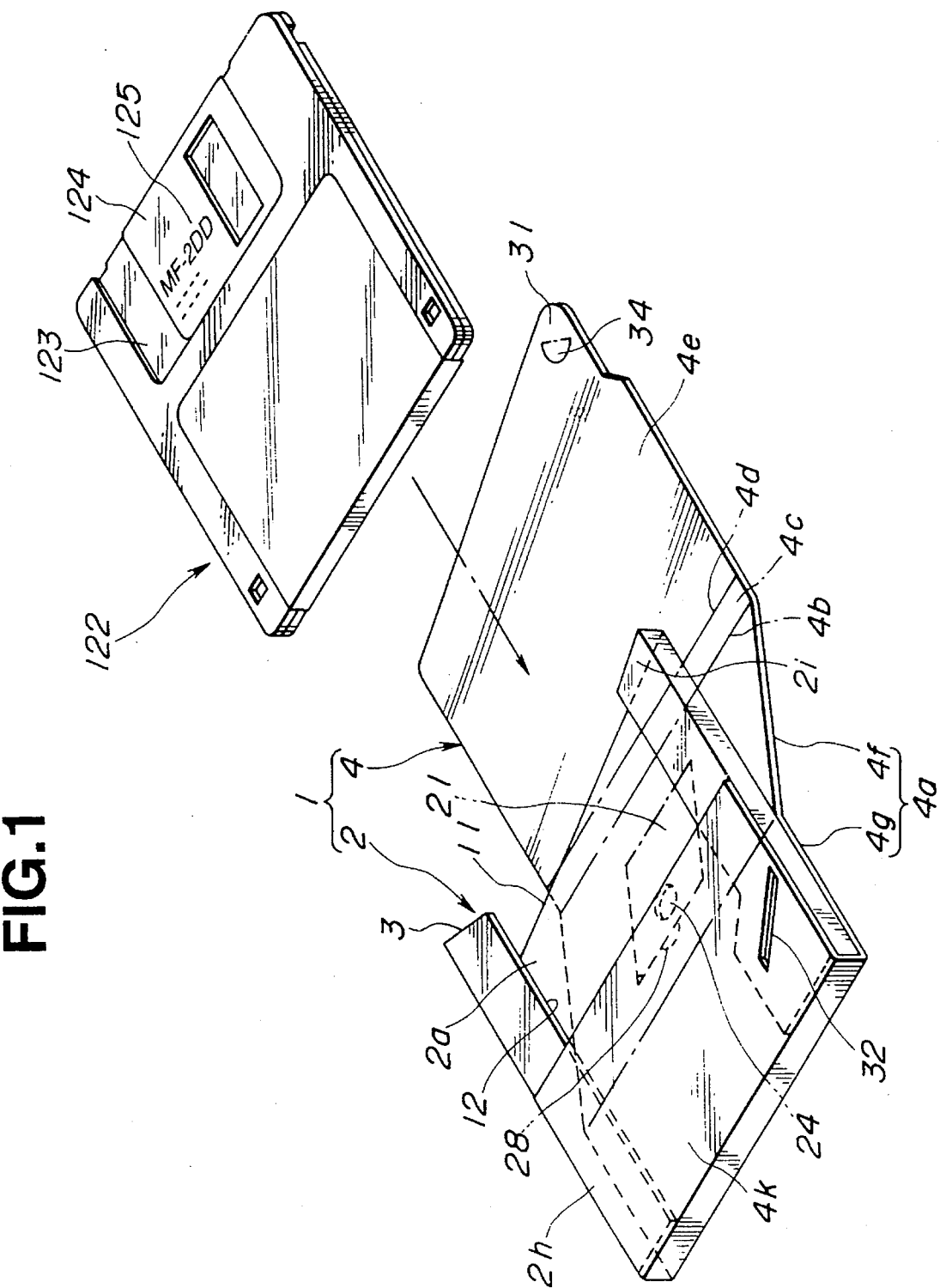
FIG. 1 is a perspective view of a disk cartridge case.

A disk cartridge case according to the present invention is described referring to FIG. 1 to FIG. 15 as follows wherein like elements are designated by like reference numerals.

FIG. 1 is a perspective view of a disk cartridge case 1. The disk cartridge case includes a case body 2 and a cover 4. The case body 2 is formed by bending a sheet member in which synthetic resin paint is coated on paper board. The cover 4 is provided on one end of the case body 2 to cover a cartridge inserting port 3.

The cover 4 includes a cover back member 4a having a non-adhesive portion 4f and an adhesion portion 4g, a closing member 4c for covering the cartridge inserting port 3 and a cover front member 4e. The cover back member 4a is superposed on a case body back member 2a of the case body 2. The closing member 4c is provided between a first bend line 4b and a second bend line 4d. The first bend line 4b is located between the closing member 4c and the non-adhesion portion 4f and enables the closing member 4c to be bent over the inserting port 3 to close the inserting port 3. The second bend line 4d is located between the closing member 4c and the cover front member 4e and enables the cover front member 4e to be superposed on left 2h and right 2i case body front plates. The non-adhesion portion 4f is capable of contacting and separating from the case body back member 2a. The adhesion portion 4g is located adjacent to the non-adhesion portion 4f and is adhered to the case body back member 2a.

Figure 6:
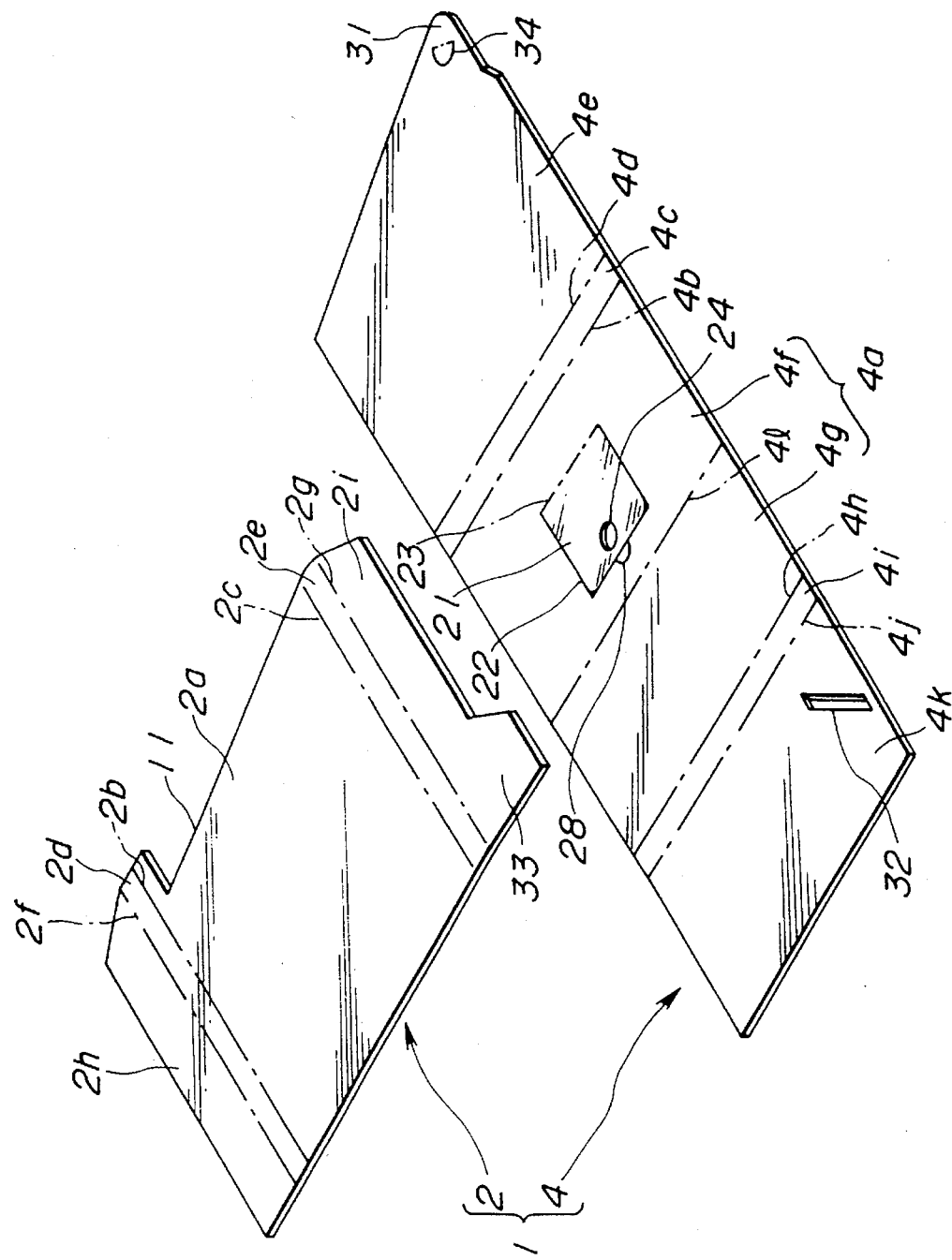
FIG. 6 is a development view.

Referring to FIG. 6, a development view of the case body 2 and the cover 4 is shown. The case body 2 further includes a left side plate 2d positioned between a left case body front plate 2h and the case body back member 2a. Third 2b and fourth 2f bend lines are located between the left side plate 2d and the case body back member 2a and between the left case body front plate 2h and the case body back member 2a, respectively. In addition, the case body 2 includes a right side plate 2e positioned between a right case body front plate 2i and the case body back member 2a. Fifth 2c and sixth 2g bend lines are located between the right side plate 2e and the case body back member 2a and between the right case body front plate 2i and the case body back member 2a, respectively. The case body back member 2a is formed in a size (area) for accommodating a disk cartridge 122. In addition, the cover 4 has the cover back member 4a formed in a size (area) for accommodating the disk cartridge 122, the closing section 4c and the cover front member 4e.

A bottom member 4i is positioned between the adhesion portion 4g and a front forming plate 4k. Seventh 4h and eighth 4j bend lines are located between the adhesion portion 4g and the bottom member 4c and between the front forming plate 4k and the adhesion portion 4g, respectively. The front forming plate 4k serves to adhere on the case body front plates 2h and 2i of the case body 2. Furthermore, in FIG. 6, 41 depicts a ninth bend line provided between the non-adhesion portion 4f and the adhesion portion 4g on the cover back member 4a of the cover 4.

Next, one example of a method of assembling is described.

Figure 7:
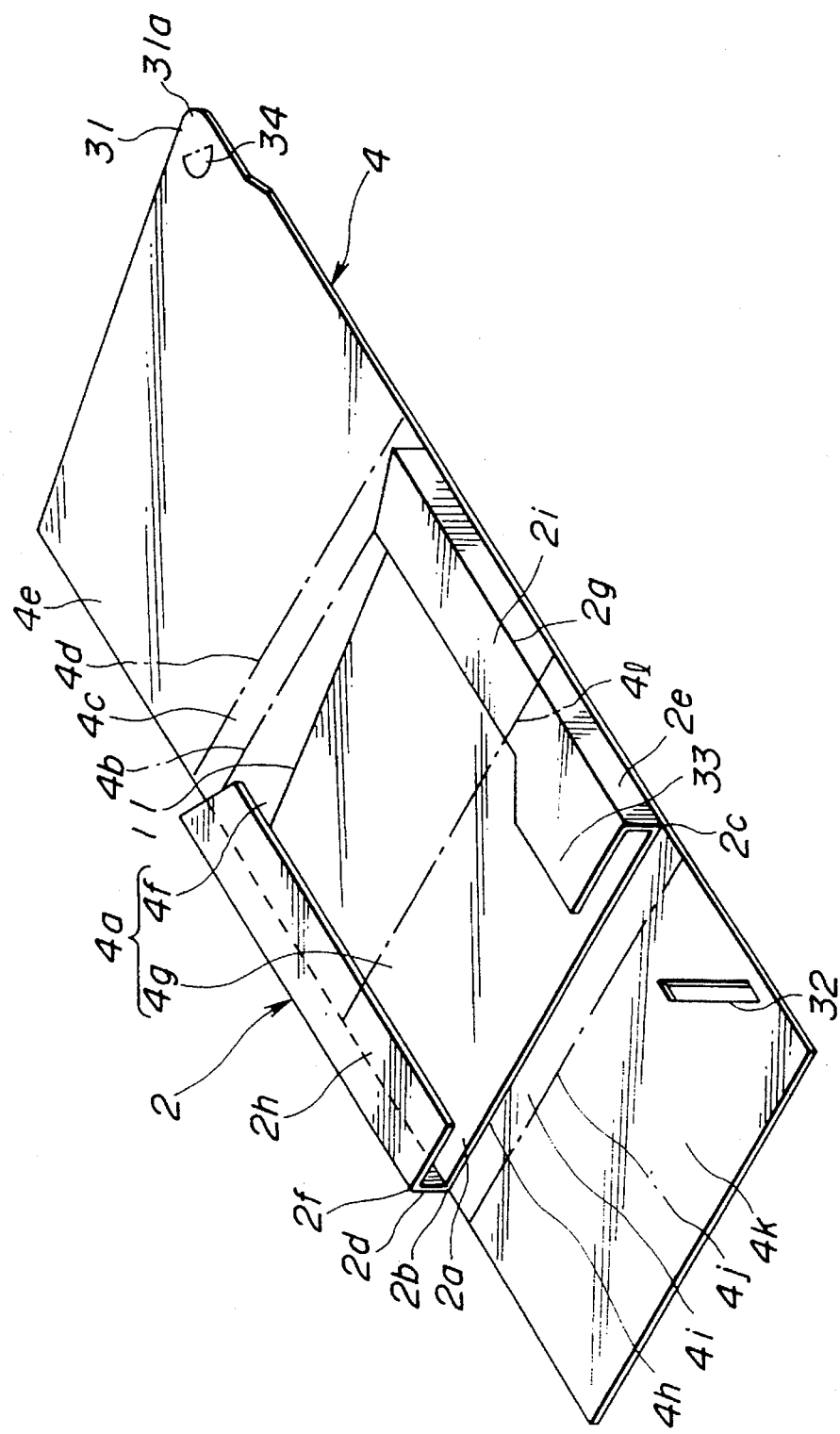
FIG. 7 is a perspective view showing an assembling process.

In the case body 2 as shown in FIG. 7, the left 2d and right 2e side-plates are bent upwardly at a right angle at the third 2b and fifth 2c bend lines, and the left 2h and right 2i case body front plates are bent inside at a right angle at the fourth 2f and sixth 2g bend lines, to form the case body 2. The case body 2 is superposed on the cover back member 4a of the cover 4, then the adhesion portion 4g of the cover back member 4a is adhered to the case body 2 by an adhesive. Thereafter, the bottom member 4i is bent upwardly at a right angle at the seventh bent line 4h, the bottom-side opening of the case body 2 is closed by that bottom member 4i. Then, the front forming plate 4k is bent upwardly to the case body 2 side at a right angle at the eighth bend line 4j such that the from forming plate 4k is superposed on the left 2h and right 2i case body front plates of the case body 2. The front forming plate 4k of the cover 4 is adhered on the left 2h and right 2i case body front plates of the case body 2, thus the disk cartridge case 1 in FIG. 1 is formed. Then the disk cartridge 122 is inserted into the case body 2 through the cartridge inserting port 3.

Figure 2:
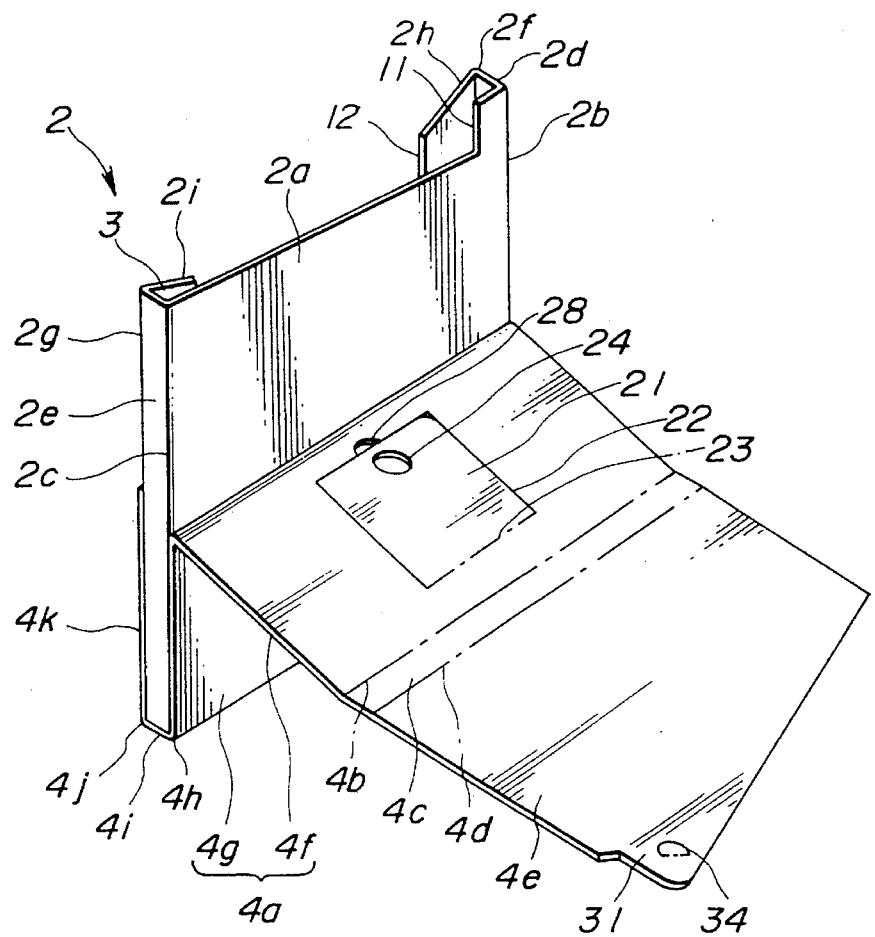
FIG. 2 is a perspective view viewed from back-side.
Figure 3:
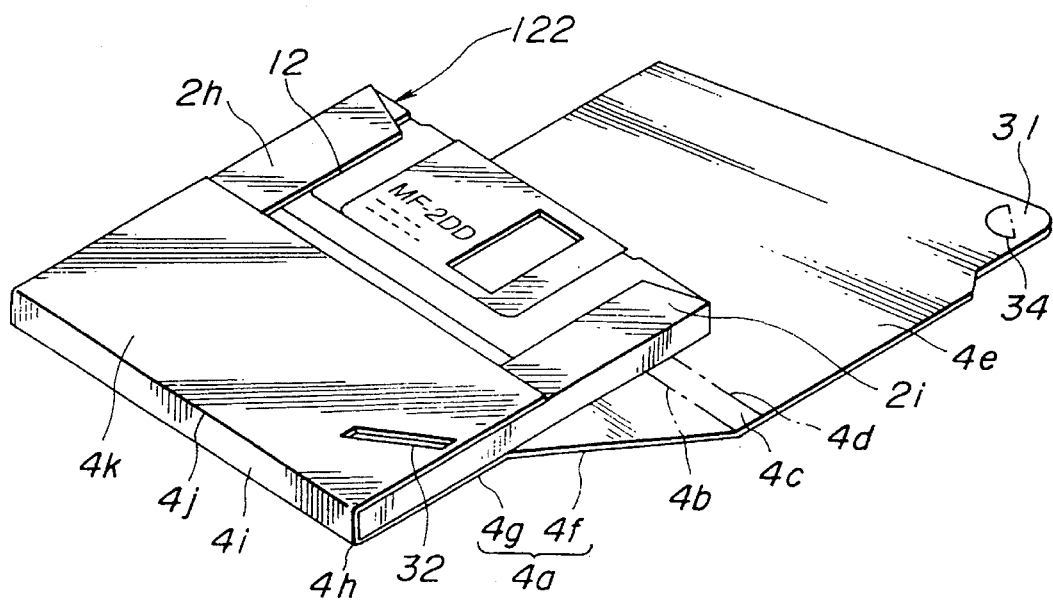
FIG. 3 is a perspective view where a disk cartridge is inserted.

Referring to FIG. 2, cut portions (windows) 11 and 12 are formed on upper ends of back-side and front-side of the case body 2 for exposing the upper end of the disk cartridge 122 accommodated in the case body 2. The cut portion 11 on the back-side is, as shown in FIG. 1, formed by cutting, at a predetermined angle, a tip end of the one-side edge of the case body back member 2a. The cut portion 12 on the front-side is formed by a gap formed between the front plates 2h, 2i and the front forming plate 4k of the cover 4 adhered to the cover body front plates 2h, 2i. In addition, the cut portion 12 on the front-side is formed in larger area than the cut portion 11. Furthermore, the cut portion 12 on the front-side is equal to or more than the area of a shutter area 123 of the disk cartridge 122.

Figure 5:
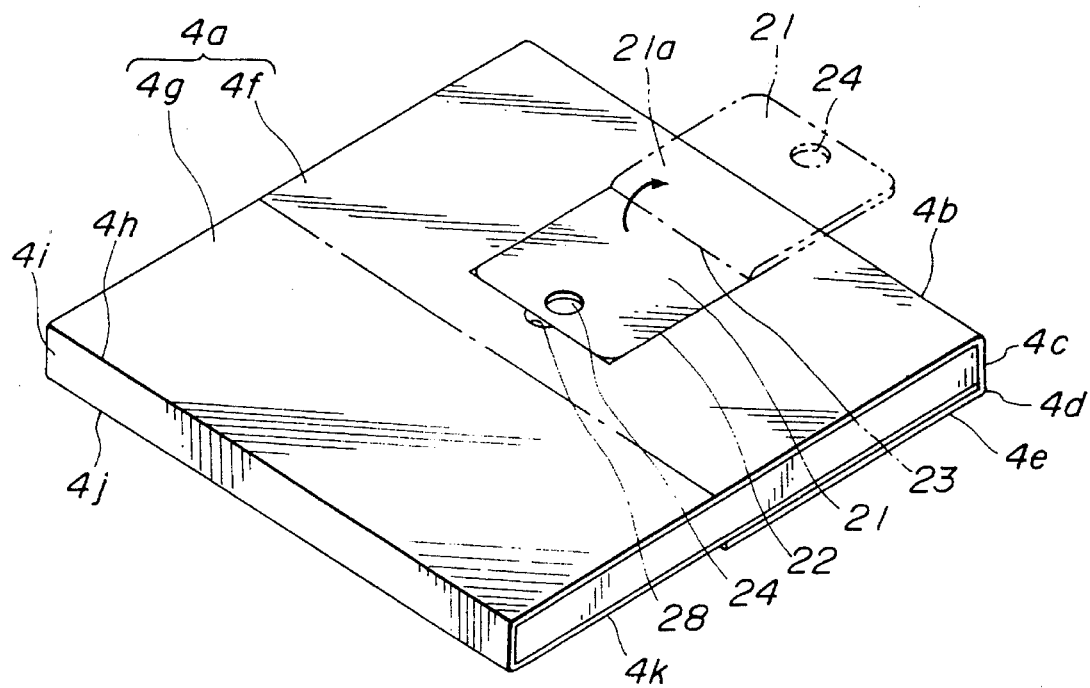
FIG. 5 is a perspective view where the covered state is viewed from back-side.
Figure 8:
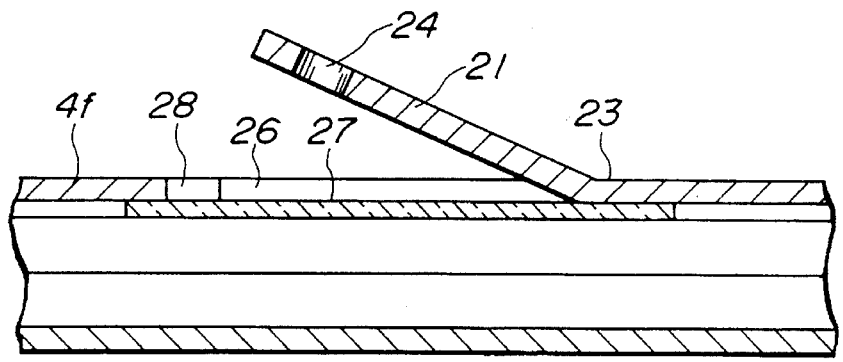
FIG. 8 is a sectional view where a cut window is blocked with a transparent sheet.
Figure 9:
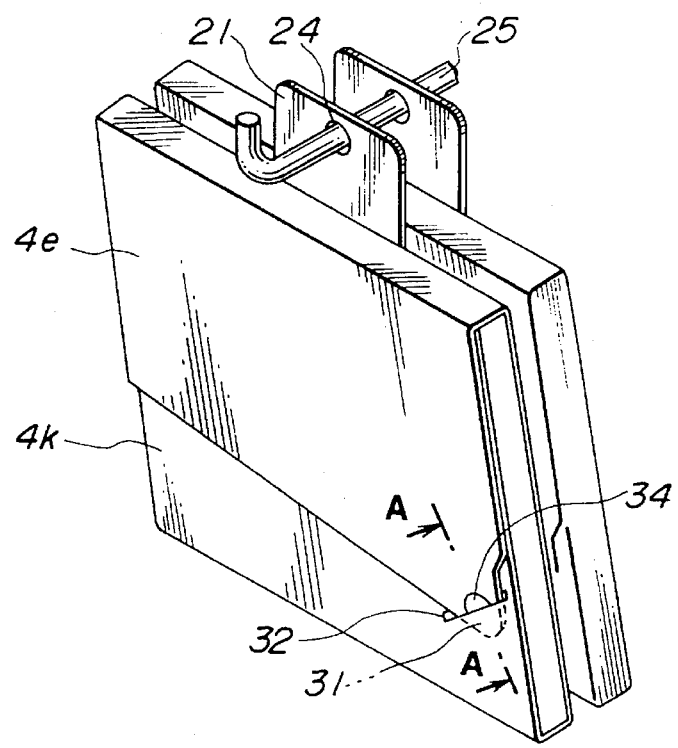
FIG. 9 is a perspective view where an insertion tab is inserted into a slot.
Figure 11:
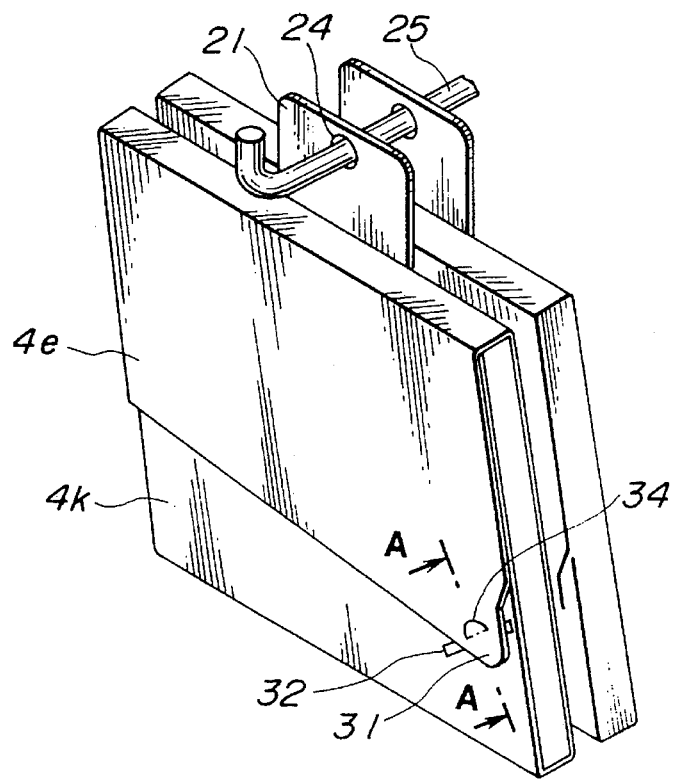
FIG. 11 is a perspective view where an extraction stop flap is engaged on edge of a slot.

The non-adhesion portion 4f of the cover back member 4a of the cover 4 is provided with a tab used for hanging therethrough (hereinafter referred to as "a hanging tab") 21 as shown in FIG. 5. The hanging tab 21 may be formed by cutting a substantially U-shaped slit or cut line 22 into the non-adhesion portion 4f wherein a top portion 21a of the hanging tab 21 which is not cut connects the hanging tab 21 to the non-adhesion portion 4f. A tenth bend line 23 is located at the top portion 21a to enable bending of the hanging tab 21 onto the outside surface of the non-adhesion portion 4f. The tenth bend line 23 is positioned such that an upper end of the hanging tab 21 protrudes upwardly from the closing section 4c, as shown by two chain lines in FIG. 5. Referring to FIG. 9 and FIG. 11, a hanger rod 25 is inserted into a hole 24 provided on the hanging tab 21, thus enabling the disk cartridge case 1 to hang on the hanger rod 25. Referring to FIG. 8, a cross sectional view of the hanging tab 21 and non-adhesion portion 4f is shown. The formation of the cut line 22 and bending upwards of the hanging tab 21 forms a cut window 26 in the non-adhesion portion 4f. Frequently, the cut portion 11 formed on the back-side of the case body 2 has a large area and extends to a position of the cut window 26. In this case, due to presence of the cut window 26, external dust and other contamination tends to enter into the case through the cut window 26 which may contaminate the dusk cartridge 22. For this reason, a sheet 27 may be affixed to an inside surface of the non-adhesion portion 4f. The sheet 27 serves to block the cut window 26 and to prevent the dust and the like from entering into the case. It is noted that the sheet 27 may be transparent to enable viewing of the interior of the disk cartridge case 1. In FIG. 5, a cut portion 28 through which a nail tip, screwdriver or other similar tool is inserted into the cut portion in peripheral edges of the cut window 26. The nail tip or tool is inserted into the cut portion 28 and hooked on peripheral edges of the hanging tab 21, to enable upward bending of the hanging tab 21 as indicated by the arrow.

In FIG. 7, an insertion tab 31 is provided on a tip end 31a of the cover front member 4e of the cover 4. A slot 32 is provided on one side of the front forming plate 4k for receiving the insertion tab 31 therein. Furthermore, the tip end 31a extends outwardly from the cover front member 4e in a way that tip end surface of the cover front member 4e is angled. The slot 32 is formed on a position on which, when the front forming plate 4k of the cover 4 is superposed on the right and left case body front plates 2h and 2i of the case body 2, the slot 32 is placed on a engagement area 33 extending of the right case body front plate 2i.

Figure 10:
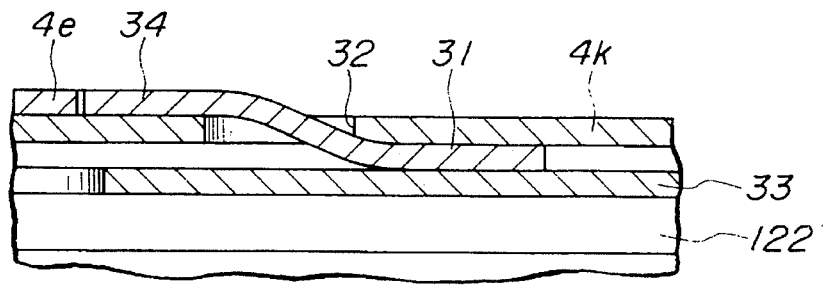
FIG. 10 is a sectional view taken along line A—A of FIG. 9.

Referring to FIGS. 9 and 10, the insertion of the tab 31 into the slot 32 will be described. FIG. 10 is a sectional view along line A—A of FIG. 9. In FIG. 9, the insertion tab 31 is shown inserted into the slot 32. Referring to FIG. 10, the insertion tab 31 is then held between an inside surface of the front forming plate 4k and the engagement area 33, hence secure engagement of the insertion tab 31 is achieved.

Figure 12:
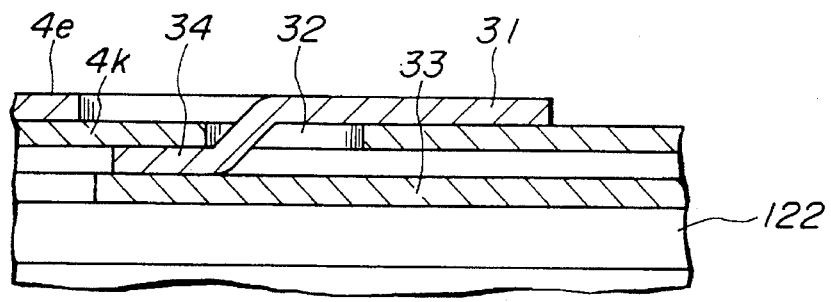
FIG. 12 is a sectional view taken along line A—A of FIG. 11.

Referring to FIG. 6, the cover front member 4e includes a locking tab 34 extending in a direction opposite to the inserting direction of the insertion tab 31 to the slot 32. The locking tab 34 is formed by cutting and bending upwards of a part of the insertion tab 31. Referring to FIGS. 11 and 12, insertion of the locking tab 34 is shown. FIG. 12 is a sectional view taken along line A—A of FIG. 11. Upon insertion, the locking tab 34 is engaged on edge of the slot 32, thus securing the insertion tab 31 and the cover front member 4e to the front forming plate 4k.

Next, a method of using the disk cartridge case 1 of this embodiment is described.

In FIG. 1, when the cover 4 opens, the non-adhesion portion 4f of the cover back member 4e of the cover 4 is separated from the case body back member 2a of the case body 2. Thus the cartridge inserting port 3 of the case body 2 is exposed. This enables the disk cartridge 122 to be inserted into the case body 2 through the cartridge inserting port 3. The shutter area 123 of the disk cartridge 122 accommodated in the case body 2 is positioned on the cut portion 12 on front-side of the case body 2. As such, a display portion 125 provided on a surface of the shutter 124 is easily read.

Figure 4:
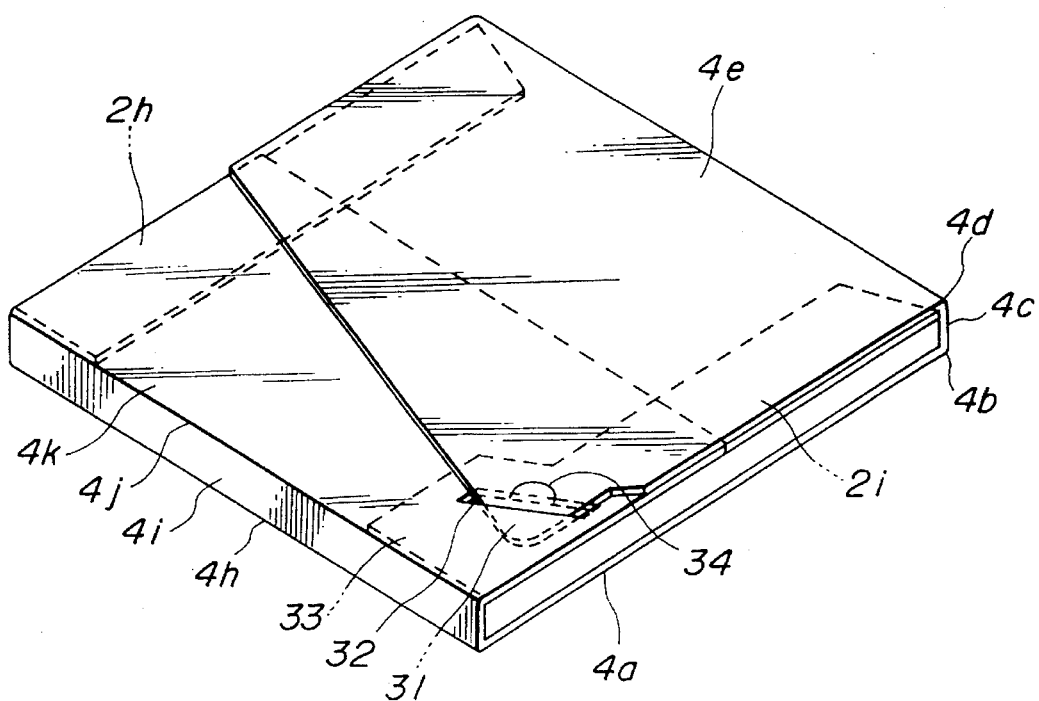
FIG. 4 is a perspective view of a covered state.

After the disk cartridge 122 is accommodated in the case body 2, the non-adhesion portion 4f of the cover back member 4a of the cover 4 is superposed on the case body back member 2a of the case body 2. Thus the cartridge inserting port 3 of the case body 2 is covered and closed by the closing member 4c. Referring to FIG. 4, the cover front member 4e is superposed on the upper surface of the front forming plate 4k. The insertion tab 31 provided on the cover front member 4e is inserted into the slot 32 so that the cover front member 4e is engaged on the front forming plate 4k, thus securing the cover front member 4e to the front forming plate 4k and covering the disk cartridge 122.

Referring to FIGS. 5 and 9, the hanging tab 21 may be bent upward as required, and the hanger rod 25 is inserted into the hole 24 provided on the hanging tab 21. The disk cartridge case 1 is allowed to hang on the hanger rod 25 thereby.

When taking out the disk cartridge 122 from the disk cartridge case 1, the insertion tab 31 is extracted from the slot 32 to enable the cover 4 to open. Thus, the non-adhesion portion 4f of the cover back member 4a separates from the case body back member 2a. Here, it is possible to take out the disk cartridge 122 from the case body 2 in a manner of holding or picking up the upper end of the disk cartridge 122 accommodated in the case body 2 through the cut portions 11 and 12 provided on the back-side and front-side of the case body 2. Further, the shape and size of the cut portions 11 and 12 on front and back sides of the case body 2 may optionally be determined.

Figure 13:
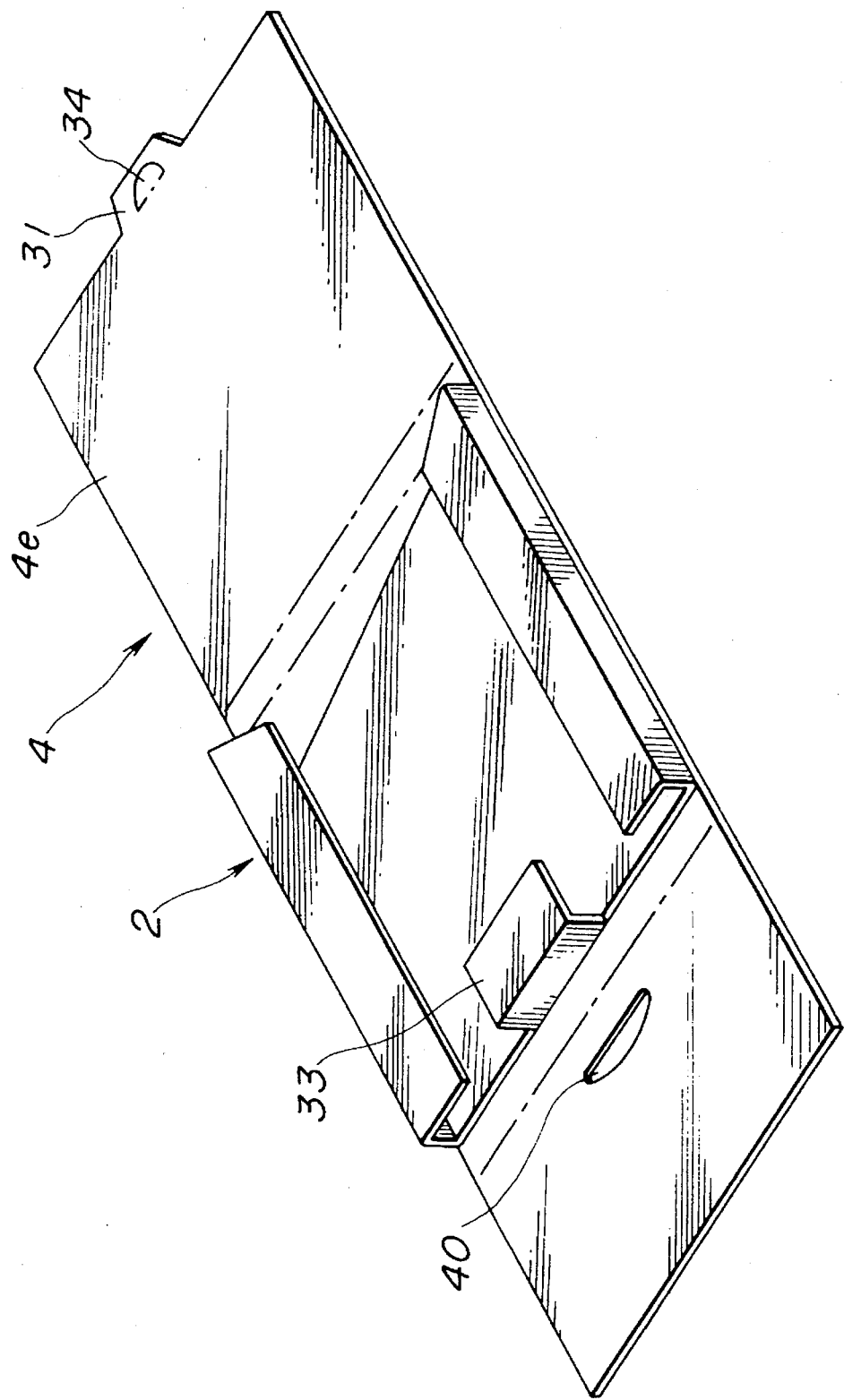
FIG. 13 is a perspective view of an alternate embodiment.

Referring to FIG. 13, an alternative embodiment of the present invention is shown. In this embodiment, the insertion tab 31 may preferably be provided on center of the tip end surface of the cover front member 4e.

In this case, a center slot 40 and the engagement area 33 are provided on center of the front forming plate 4k depending on the position of the insertion tab 31. A narrow width W of the slot 40 provides difficulty of inserting the insertion tab 31 therein, and on inserting, the insertion tab 31 is bent or broken, thus the paper layers are separated. Too large width W of the slot 40 tends to make the insertion tab 31 slack, or to permit dust and the like to enter through the slot 40.

Figure 15:
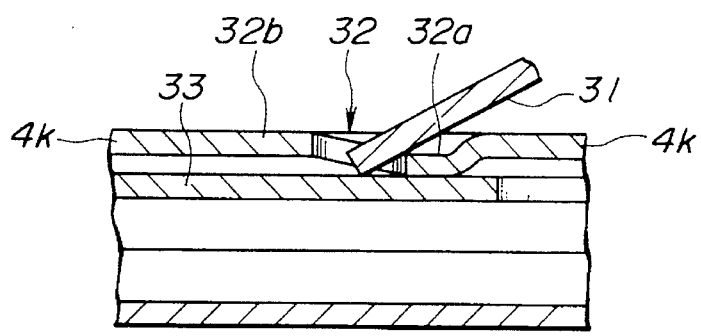
FIG. 15 is a sectional view where an insertion tab is inserted.
Figure 14:
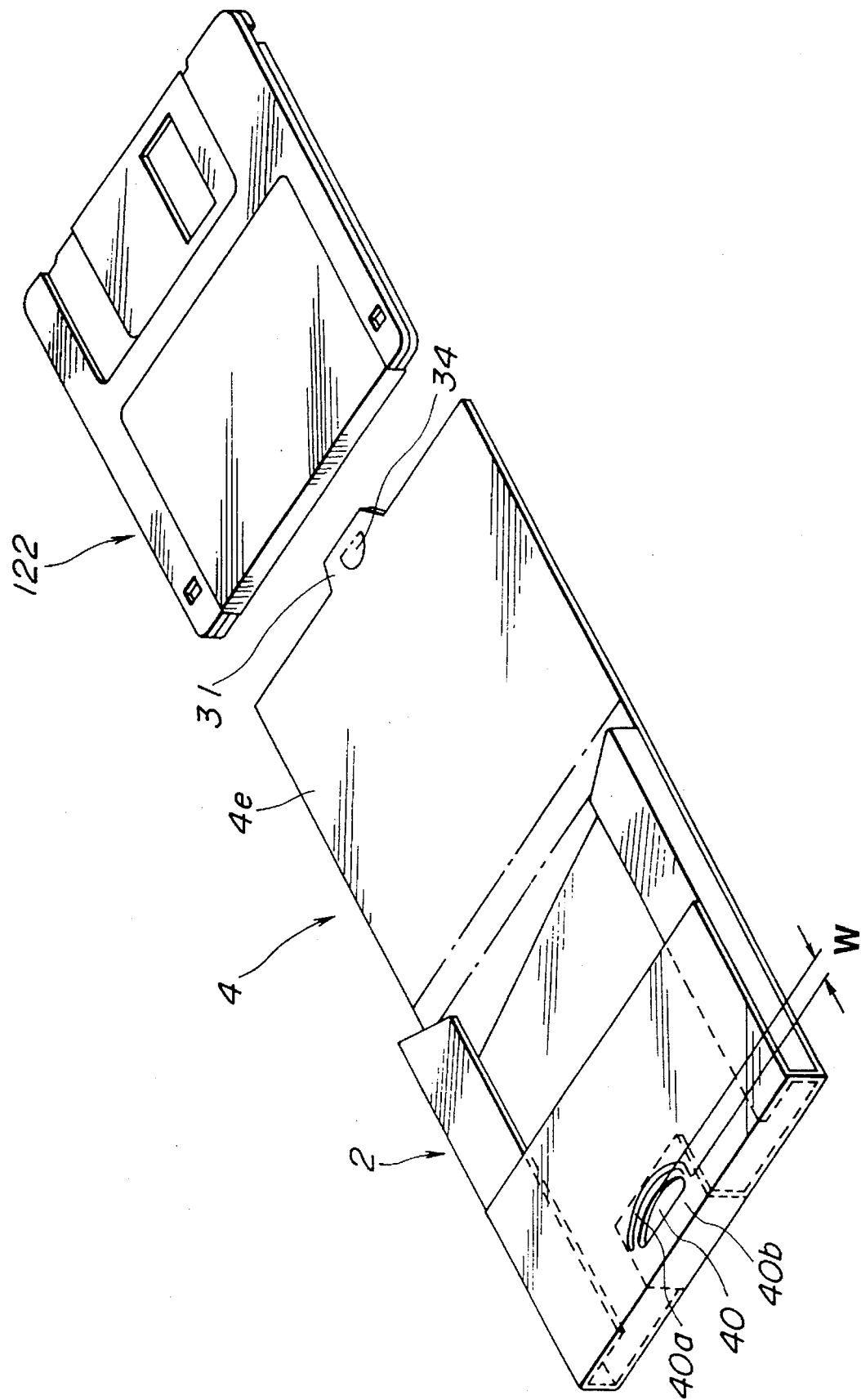
FIG. 14 is a perspective view where a part of peripheral edge portion of a slot is has a concave shape.

Referring to FIGS. 14 and 15, a perspective view of the slot 40 is shown. Referring to FIG. 15, a sectional view of the alternate embodiment is depicted where the insertion tab is shown inserted. In this embodiment, as shown in FIGS. 14 and 15, a peripheral edge 40a of the slot 40 is formed into a concave shape by press machining or the like, and further located lower than an opposite-side peripheral edge 40b to enable the insertion tab 31 to be easily inserted into the slot 40. The peripheral edge 40a may be die-pressed at the same time of punching the slot 40, or may be formed at the same time of forming a bent line having a ruled line shape.

In the embodiments described above, a sheet shaped member constituting the disk cartridge case 1 is made of material in which synthetic resin paint is coated on surface of paper. However, the sheet shaped member constituting the disk cartridge case 1 may preferably be made of lamination of the synthetic resin sheets on the paper. Further, a lamination of metal foils such as aluminum or the like may be included in the intermediate portion thereof to provide increased magnetic shieldability and upgraded durability. In addition, an elimination of magnetic materials such as iron or the like into the intermediate portion provides magnetic shieldability, also.

The disk cartridge case according to the present invention provides effects as hereinafter described.

(1) The disk cartridge case of the present invention, with the cover being opened, and the non-adhesion portion of the back member of the cover separated from back surface of the case body results in the upper end of the case body being protruded from the cover to provide easier insertion and take-out of the disk cartridge for the cover body.

(2) In the disk cartridge case of the present invention, the disk cartridge may be easily removed because front and back surfaces of upper end of the disk cartridge contained within the case body may be gripped by fingers, tools or the like through the cut portions for taking out the disk cartridge, which are provided on the front and back surfaces of the case body.

(3) The disk cartridge case of the present invention enables removal of the disk cartridge from inside of the case body by gripping the front surface and back surface of the disk cartridge by inserting the thumb through a larger cut portion on front side and the forefinger through a smaller cut portion on back side, the cut portion on the front-side being made larger than the cut portion on the back-side.

(4) In the disk cartridge case of the present invention, the cut portion on front-side of the case body is formed in a size for accommodating the shutter area of the disk cartridge or more, thus even when the disk cartridge is contained in the case body, the shutter is exposed by the cut portion, therefore it is possible to read matter displayed on surface of the shutter.

(5) The disk cartridge case of the present invention includes the hanging tab to enable the disk cartridge case to hang or to be exhibited on the hanger rod or the like.

(6) In the disk cartridge case of the present invention, the hanging tab is formed into a leaf shape by cutting and upward bending of a part of the non-adhesion portion of the back member of the cover. The hanging tab is formed of different members from those of the cover to therefore reduce complicated construction of the disk cartridge case by reducing the number of parts and assembly processes.

(7) In the disk cartridge case of the present invention, the cut window formed by cutting and bending of the hanging tab is covered by the sheet, to reduce dust and the like through the cut window from entering into the case body. In addition, this enables viewing through inside of the case body if a transparent sheet is used.

(8) The disk cartridge case of the present invention further provides the cut portion for inserting a nail tip or a tool into peripheral edge of the cut window for forming the hanging tab, to enable insertion of the nail tip through the cut portion, to hook the nail tip on the peripheral edge of the tab, and to easily move the tab away from the non-adhesion portion.

(9) In the disk cartridge case of the present invention, when inserting the insertion tab into the slot, the insertion tab is securely held between the inside surface on front of the case body and the engagement area, and more firmly engaged in the slot. The engagement area prevents the insertion tab from contacting with the disk cartridge.

(10) The disk cartridge case of the present invention provides the locking tab extending in a direction reverse to an inserting direction to the slot of the insertion tab. Then, by hooking the locking tab on edge of the slot, even when the front member receives a force in the reverse direction to the inserting direction to the slot of the insertion tab, i.e., the force in the direction of opening the front member, the cover is inhibited from being separated from the front forming plate.

(11) The configuration of the disk cartridge case of the present invention enables the manufacture of the disk cartridge cases by using simple and inexpensive equipment.

(12) In the disk cartridge case of the present invention, the sheet shaped member is formed of materials in which synthetic resin paint is coated on surface of paper board, this therefore upgrades mechanical strength of the paper with an increased durability.

While the present invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as falling within the scope of the appended claims.

What is claimed is:

1. A disk cartridge case comprising:

case body for accommodating a disk cartridge; and a cover for covering a cartridge inserting port provided on an end of said case body;

said case body comprising a case body back member, a case body front plate and a side plate;

said cover comprising a cover back member superposed on said case body back member, a cover front member superposed on said case body front plate, a front forming member, a closing portion for opening and closing said cartridge inserting port located between said cover back member and said cover front member and a bottom member located between said cover back member and said front forming plate;

said back member comprising a non-adhesion portion located at a side of said closing member and being capable of contacting and separating from said case body back member of said case body and an adhesion portion located opposite said closing member and being adhered to said case body back member of said case body.

2. A disk cartridge case according to claim 1, wherein said case body and said cover are formed by bending a sheet member.

3. A disk cartridge case according to claim 2, wherein said sheet member is formed by coating synthetic resin paint on paper.

4. A disk cartridge case comprising:

a case body for accommodating a disk cartridge; and a cover for covering a cartridge inserting port provided on an end of said case body;

said case body comprising a case body back member, a case body front plate and a side plate;

said cover comprising a cover back member superposed on said case body back member, a cover front member superposed on said case body front plate, a front forming member, a closing portion for opening and closing said cartridge inserting port located between said cover back member and said cover front member and a bottom member located between said cover back member and said front forming plate;

said back member comprising a non-adhesion portion located at a side of said closing member and being capable of contacting and separating from said case body back member of said case body and an adhesion portion located opposite said closing member and being adhered to said case body back member of said case body, wherein said case body includes cut portions for removing said disk cartridge, said cut portions being provided at the front and back sides of said cartridge inserting port.

5. A disk cartridge case according to claim 4 wherein said case body and said cover are formed by bending a sheet member.

6. A disk cartridge case according to claim 5, wherein said sheet member is formed by coating synthetic resin paint on paper.

7. A disk cartridge case according to claim 4, wherein said cut portion of the font side of said case body is formed in a larger area than said cut portion of the back side of said case body.

8. A disk cartridge case according to claim 7, wherein said case body and said cover are formed by bending a sheet member.

9. A disk cartridge case according to claim 8, wherein said sheet member is formed by coating synthetic resin paint on paper.

10. A disk cartridge case according to claim 7, wherein said cut portion of the front side of said case body is formed in an area for accommodating at least a shutter area of said disk cartridge.

11. A disk cartridge case according to claim 7, wherein said case body and said cover are formed by bending a sheet member.

12. A disk cartridge case according to claim 11, wherein said sheet member is formed by coating synthetic resin paint on paper.

13. A disk cartridge case comprising:

a case body for accommodating a disk cartridge; and a cover for covering a cartridge inserting port provided on an end of said case body;

said case body comprising a case body back member, a case body front plate and a side plate;

said cover comprising a cover back member superposed on said case body back member, a cover front member superposed on said case body front plate, a front forming member, a closing portion for opening and closing said cartridge inserting port located between said cover back member and said cover front member and a bottom member located between said cover back member, and said front forming plate;

said back member comprising a non-adhesion portion located at a side of said closing member and being capable of contacting and separating from said case body back member of said case body and an adhesion portion located opposite said closing member and being adhered to said case body back member of said case body, wherein said non-adhesion portion includes a tab for hanging therethrough.

14. A disk cartridge case according to claim 13, wherein said case body and said cover are formed by bending a sheet member.

15. A disk cartridge case according to claim 14, wherein said sheet member is formed by coating synthetic resin paint on paper.

16. A disk cartridge case according to claim 13, wherein said tab is formed by cutting a leaf shape in said non-adhesion portion and bending said leaf shape upwards thus forming an aperture in said non-adhesion portion.

17. A disk cartridge case according to claim 16, wherein said aperture is covered by a sheet adhered on an inside surface of said non-adhesion portion for reducing contamination of said disk cartridge.

18. A disk cartridge case according to claim 16, wherein a aperture window includes a cut portion for inserting a nail tip or tool.

19. A disk cartridge case comprising:

a case body for accommodating a disk cartridge; and a cover for covering a cartridge inserting port provided on an end of said case body;

said case body comprising a case body back member, a case body front plate and a side plate;

said cover comprising a cover back member superposed on said case body back member, a cover front member superposed on said case body front plate, a front forming member, a closing portion for opening and closing said cartridge inserting port located between said cover back member and said cover front member and a bottom member located between said cover back member and said front forming plate;

said back member comprising a non-adhesion portion located at a side of said closing member and being capable of contacting and separating from said case body back member of said case body and an adhesion portion located opposite said closing member and being adhered to said case body back member of said case body;

said cover from member having an insertion tab on its tip end;

said cover having a slot for receiving said insertion tab;

said case body having an engagement area, wherein said insertion tab is moved in an inserting direction and inserted into said slot such that said insertion tab is held between said cover front member of said cover and said engagement area.

20. A disk cartridge case according to claim 19, wherein said case body and said cover are formed by bending a sheet member.

21. A disk cartridge case according to claim 20, wherein said sheet member is formed by coating synthetic resin paint on paper.

22. A disk cartridge case according to claim 19, wherein said cover front member has a locking tab on said insertion tab extending in a direction opposite of said inserting direction.

23. A disk cartridge case according to claim 22, wherein said case body and said cover are firmed by bent sheet member.

24. A disk cartridge case according to claim 23, wherein said sheet member is formed by coating synthetic resin paint on paper.

25. A disk cartridge case comprising:

a case body for accommodating a disk cartridge; and a cover for covering a cartridge inserting port provided on an end of said case body;

said case body comprising a case body back member, a case body front plate and a side plate;

said cover comprising a cover back member superposed on said case body back member, a cover front member superposed on said case body front plate, a front forming member, a closing portion for opening and closing said cartridge inserting port located between said cover back member and said cover front member and a bottom member located between said cover back member and said front forming plate;

said back member comprising a non-adhesion portion located at a side of said closing member and being capable of contacting and separating from said case body back member of said case body and an adhesion portion located opposite said closing member and being adhered to said case body back member of said case body;

said cover front member having an insertion tab located in a corner of its tip end;

said cover having a slot for receiving said insertion tab;

said case body having an engagement area, wherein said insertion tab is moved in an inserting direction and inserted into said slot such that said insertion tab is held between said cover front member of said cover and said engagement area.

26. A disk cartridge case comprising:

a case body for accommodating a disk cartridge; and a cover for covering a cartridge inserting port provided on an end of said case body;

said case body comprising a case body back member, a case body front plate and a side plate;

said cover comprising a cover back member superposed on said case body back member, a cover front member superposed on said case body front plate, a front forming member, a closing portion for opening and closing said cartridge inserting port located between said cover back member and said cover front member and a bottom member located between said cover back member and said front forming plate;

said back member comprising a non-adhesion portion located at a side of said closing member and being capable of contacting and separating from said case body back member of said case body and an adhesion portion located opposite said closing member and being adhered to said case body back member of said case body;

said cover front member having an insertion tab on a center portion of its tip end;

said cover having a slot for receiving said insertion tab;

said case body having an engagement area, wherein said insertion tab is moved in an inserting direction and inserted into said slot such that said insertion tab is held between said cover front member of said cover and said engagement area.

* * * * *